(12) United States Patent
Cunefare et al.

(10) Patent No.: US 12,117,116 B2
(45) Date of Patent: Oct. 15, 2024

(54) SYSTEMS AND METHODS FOR A FLUID NOISE SUPPRESSOR (71) Applicant: Georgia Tech Research Corporation, Atlanta, GA (US)

(72) Inventors: Kenneth A. Cunefare, Atlanta, GA (US); Nathaniel R. Pedigo, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 452 days.

(21) Appl. No.: 17/605,987

(22) PCT Filed: Apr. 23, 2020

(86) PCT No.: PCT/US2020/029526
§ 371 (c)(1),
(2) Date: Oct. 22, 2021

(87) PCT Pub. No.: WO2020/219678
PCT Pub. Date: Oct. 29, 2020

(65) Prior Publication Data
US 2022/0196197 A1    Jun. 23, 2022

Related U.S. Application Data

(60) Provisional application No. 62/837,582, filed on Apr. 23, 2019.

(51) Int. Cl.
*F16L 55/033* (2006.01)
*F16L 55/04* (2006.01)
(Continued)

(52) U.S. Cl.
CPC ............ *F16L 55/05* (2013.01); *G10K 11/165* (2013.01)

(58) Field of Classification Search
CPC ...... G10K 11/165; G10K 11/162; F01N 1/10; F01N 1/24; F16L 55/04; F16L 55/045;
(Continued)

(56) References Cited

U.S. PATENT DOCUMENTS 2,495,693 A    1/1950    Byrd et al.
2,875,788 A    3/1959    Pier
(Continued)

FOREIGN PATENT DOCUMENTS

CA    2965249 A1 * 10/2018
CN    107191732 A    9/2017
(Continued)

OTHER PUBLICATIONS

International Search Report and Written Opinion from Application No. PCT/US2020/029526 dated Mar. 12, 2021.
(Continued)

*Primary Examiner* — Edgardo San Martin
(74) *Attorney, Agent, or Firm* — Troutman Pepper Hamilton Sanders LLP; Ryan A. Schneider (57) ABSTRACT

An example fluid system can include a fluid noise suppressor having a resilient insert having an outer surface; wherein the resilient insert can be operable to dampen a fluctuation of a total pressure about a mean static pressure, providing effective noise reduction that without the resilient insert, would have occurred in the flowing fluid with the fluctuation; and wherein the mean static pressure can be between about 100 psig to about 10,000 psig.

26 Claims, 3 Drawing Sheets

(51) Int. Cl.
*F16L 55/05* (2006.01)
*G10K 11/165* (2006.01)

(58) Field of Classification Search
CPC ... F16L 55/054; F16L 55/0336; F16L 55/033; F16L 55/0332; F16L 55/05; F16L 55/02; Y10T 137/3118
See application file for complete search history.

(56) References Cited

U.S. PATENT DOCUMENTS

| | | | | |
|---|---|---|---|---|
| 2,918,090 | A * | 12/1959 | De Witt | F16L 55/054 138/30 |
| 2,918,091 | A | 12/1959 | Borden | |
| 3,103,234 | A | 9/1963 | Washburn | |
| 3,665,967 | A | 5/1972 | Kachnik | |
| 4,314,621 | A | 2/1982 | Hansen | |
| 4,497,388 | A * | 2/1985 | Dexter | F16L 55/053 181/269 |
| 4,580,656 | A * | 4/1986 | Fukuda | F01N 1/006 181/252 |
| 4,897,906 | A * | 2/1990 | Bartholomew | F16L 55/05 138/30 |
| 5,777,947 | A * | 7/1998 | Ahuja | E04B 1/84 367/1 |
| 5,926,954 | A * | 7/1999 | Wolf | D04H 3/004 29/890.053 |
| 6,672,337 | B2 * | 1/2004 | Kobayashi | F16L 55/045 220/721 |
| 6,948,479 | B1 * | 9/2005 | Raney | F15B 1/16 123/456 |
| 7,497,233 | B2 * | 3/2009 | Egli | F16L 55/0332 138/30 |
| 7,562,678 | B1 | 7/2009 | Kulikov | |
| 7,874,317 | B1 * | 1/2011 | Kulikov | F16L 55/041 220/721 |
| 10,077,352 | B2 * | 9/2018 | Funderburg | F16F 15/02 |
| 10,418,016 | B2 * | 9/2019 | Goldstein | A61F 11/10 |
| 2003/0159743 | A1 | 8/2003 | Kobayashi et al. | |
| 2005/0042437 | A1 * | 2/2005 | Ramesh | C08J 9/0066 428/315.7 |
| 2006/0124385 | A1 * | 6/2006 | Lucas | F16L 55/0336 181/258 |
| 2008/0006478 | A1 * | 1/2008 | Dreyer | F16L 55/0336 181/205 |
| 2010/0133038 | A1 * | 6/2010 | Weber | F16L 55/0336 181/233 |
| 2011/0005630 | A1 | 1/2011 | Al-Khomairi | |
| 2012/0024413 | A1 | 2/2012 | Yang et al. | |
| 2016/0075905 | A1 * | 3/2016 | Funderburg | B29C 65/48 252/62 |
| 2018/0180073 | A1 | 6/2018 | Potts et al. | |
| 2019/0041154 | A1 * | 2/2019 | Cheinet | F41A 21/30 |
| 2022/0146034 | A1 * | 5/2022 | Cunefare | F16L 55/0336 |

FOREIGN PATENT DOCUMENTS

| | | | | |
|---|---|---|---|---|
| EP | 1002984 | A2 * | 5/2000 | E03C 1/04 |
| FR | 2738326 | A1 * | 3/1997 | F16L 55/033 |
| FR | 2903110 | A1 * | 1/2008 | B29B 17/0042 |
| JP | H07293371 | A * | 11/1995 | |
| JP | H08326986 | A * | 12/1996 | |
| WO | WO-2010103813 | A1 * | 9/2010 | F01N 1/24 |

OTHER PUBLICATIONS

European Supplemental Search Report from Application No. 20794874.6 dated Oct. 27, 2022.

* cited by examiner

FIG. 3

SYSTEMS AND METHODS FOR A FLUID NOISE SUPPRESSOR

CROSS-REFERENCE TO RELATED APPLICATIONS

This application claims the benefit of U.S. Provisional Application No. 62/837,582, filed 23 Apr. 2019, incorporated herein by reference in its entirety as if fully set forth below.

BACKGROUND

Noise in fluid systems is a common issue in industrial, commercial, and residential settings. Fluid-borne noise may be generated by the action of pumps, valves, and actuators, and just through the turbulent flow of liquids. Commercially available technology uses a pressurized gas bladder, with complex internals, to control noise. This device requires continual maintenance contact to maintain the gas charge; if the bladder fails, the device loses its noise control function. Additionally, the complex internals are costly.

Thus, it would be advantageous to have a fluid noise suppressor that does not have moving parts and reduce the number and cost of replacements or repairs of a fluid noise suppressors device.

SUMMARY

It is an object of the present invention to provide systems, devices, and methods to meet the above-stated needs.

An example fluid system can include a fluid noise suppressor having a resilient insert having an outer surface; wherein the resilient insert can be operable to dampen a fluctuation of a total pressure about the mean static pressure, providing effective noise reduction that without the resilient insert, would have occurred in the flowing fluid with the fluctuation; and wherein the mean static pressure is between about 100 psig to about 10,000 psig.

In some examples, the fluid noise suppressor can further include an outer shell extending for a length of the outer surface of the resilient insert and defining a fluid channel between the outer surface of the resilient insert and an inner surface of the outer shell.

In some examples, the fluid noise suppressor can further include a restraining portion integral to the outer shell and operable to restrain the resilient insert within the outer shell.

In some examples, the resilient insert and the outer shell can be concentrically aligned.

In some examples, the fluid noise suppressor can further include a permeable cage extending along the outer surface of the resilient insert and placed between the outer shell and the resilient insert.

In some examples, the resilient insert can include an inner surface defining therethrough a channel for a fluid flowing along a length of the resilient insert having a mean static pressure.

In some examples, the fluid noise suppressor can further include an outer shell extending for a length of the outer surface of the resilient insert.

In some examples, the fluid system can further include an existing length of a fluidic conduit; wherein the fluid noise suppressor can be located between an upstream portion and downstream portion of the existing length of the fluidic conduit; and wherein the upstream portion of the existing length of the fluidic conduit, the fluid noise suppressor, and the downstream portion of the existing length of the fluidic conduit, can be in fluidic communication along the existing length of the portions and fluid noise suppressor.

In some examples, the fluid noise suppressor system can include a fluid inlet connector disposed on an upstream end of the fluid noise suppressor providing both connectivity of the upstream end of the fluid noise suppressor to the upstream portion of the fluidic conduit and to inhibit travel of the resilient insert into the upstream portion of the fluidic conduit; and a fluid outlet connector disposed on a downstream end of the fluid noise suppressor providing both connectivity of the downstream end of the fluid noise suppressor to the downstream portion of the fluidic conduit and to inhibit travel of the resilient insert into the downstream portion of the fluidic conduit.

In some examples, the resilient insert can include a first discrete resilient insert portion and a second discrete resilient insert portion that can be operable to physically abut one another, preventing radial compression of the resilient insert that would lead to ineffective noise reduction.

In some examples, the resilient insert can include an annular cross-section; and wherein each of the discrete resilient insert portion includes a partially annular cross-section.

In some examples, the resilient insert can be segmented axially to form the first discrete resilient insert portion and the second discrete resilient insert portion.

In some examples, each resilient insert portion can include a polymeric matrix having a stiffness; and microspheres dispersed within the polymeric matrix; wherein the microspheres can be pressurized to a pressure of 0.1 MPa or greater; and wherein the stiffness of the polymeric matrix of at least one of the resilient inserts can be different from another of the resilient inserts.

In some examples, each resilient insert portion can include a polymeric matrix having a stiffness; and microspheres dispersed within the polymeric matrix.

In some examples, the microspheres can be pressurized to an internal pressure of 0.1 MPa or greater; and wherein the microspheres can be homogeneously dispersed within the polymeric matrix.

In some examples, the microspheres can be pressurized to an internal pressure of 0.1 MPa or greater; and wherein the microspheres can be heterogeneously dispersed within the polymeric matrix.

An example fluid noise suppressor system can include an upstream portion of a fluidic conduit; a fluid noise suppressor located downstream of the upstream portion of the fluidic conduit; and a downstream portion of the fluidic conduit being located downstream of the fluid noise suppressor; wherein the fluid noise suppressor can include a resilient insert having an outer surface and an inner surface, the inner surface defining therethrough a channel having an inner diameter substantially similar to an inner diameter of the upstream and downstream portions of the fluidic conduit; and an outer shell extending for a length of the outer surface of the resilient insert; wherein the fluid noise suppressor and the portions of the fluidic conduit can be configured for a flowing fluid within each having a mean static pressure; wherein the resilient insert includes a first discrete resilient insert portion and a second discrete resilient insert portion that can be operable to physically abut one another, preventing radial compression of the resilient insert that would lead to ineffective fluid noise reduction; wherein the resilient insert can be operable to dampen a fluctuation of a total pressure about a mean static pressure, providing effective noise reduction that without the resilient insert, would have occurred in the flowing fluid with the fluctuation; and wherein the mean static pressure is between about 100 psig to about 10,000 psig.

In some examples, the resilient insert can include an annular cross-section; and wherein each of the discrete resilient insert portion includes a partially annular cross-section.

In some examples, the resilient insert can be segmented axially to form the first discrete resilient insert portion and the second discrete resilient insert portion.

In some examples, the fluid noise suppressor system can further include a fluid inlet connector disposed on an upstream end of the fluid noise suppressor providing both connectivity of the upstream end of the fluid noise suppressor to the upstream portion of the fluidic conduit and to inhibit travel of the resilient insert into the upstream portion of the fluidic conduit; and a fluid outlet connector disposed on a downstream end of the fluid noise suppressor providing both connectivity of the downstream end of the fluid noise suppressor to the downstream portion of the fluidic conduit and to inhibit travel of the resilient insert into the downstream portion of the fluidic conduit.

In some examples, the fluid noise suppressor system can further include a permeable tube extending for the length of the inner surface of the resilient insert and operable to enable fluidic communication from the fluid inlet connector through the fluid outlet connector.

In some examples, the permeable tube comprising a flange located on least at one end of the permeable tube and operable to restrain the resilient insert within the outer shell.

In some examples, the fluid noise suppressor system can further include a restraining portion integral to the outer shell and operable to restrain the resilient insert within the outer shell.

In some examples, the fluid noise suppressor system can further include a fluid inlet connector disposed on an upstream end of the fluid noise suppressor; a fluid outlet connector disposed on a downstream end of the fluid noise suppressor; and a restraining insert; wherein the restraining insert can further include a permeable tube; and wherein the permeable tube can be operable to enable fluidic communication from the fluid inlet connector through the fluid outlet connector.

In some examples, the fluid noise suppressor system can further include a flange with an outer diameter disposed on an end of the permeable tube; wherein the outer diameter of the flange can be sized to abut an inner surface of the outer shell; and wherein the flange can be operable to restrain the resilient insert within the length of the outer shell.

In some examples, the fluid noise suppressor system can further include a restraining portion integral to the outer shell and operable to restrain the resilient insert within the outer shell.

An example method for manufacturing a fluid noise suppressor can include providing a resilient insert having an outer surface and an inner surface, the inner surface defining therethrough a channel for a fluid flowing along a length of the resilient insert, the resilient insert can be operable to dampen a fluctuation of a total pressure in the fluid that exceeds a mean static pressure, providing effective fluid-borne noise suppression that without the resilient insert, would have occurred in the flowing fluid with the fluctuation; providing an outer shell extending along the outer surface of the resilient insert, the outer shell having an integral fluid connector, and an inner wall, the integral fluid connector disposed on a upstream end of the outer shell is configured to provide fluid connectivity between a upstream portion of the channel and an upstream end of a fluidic conduit; providing a restraining insert comprising a permeable tube operable to enable fluidic communication between the outer surface of the resilient insert and the channel; providing a discrete fluid connector disposed on a downstream end of the outer shell providing fluid connectivity between a downstream portion of the channel and a downstream end of the fluidic conduit; inserting the restraining insert within the outer shell; inserting the resilient insert into the outer shell; and attaching the discrete fluid connector to the downstream end of the outer shell.

In some examples, the restraining insert of the fluid noise suppressor can further include a flange with an outer diameter disposed on an end of the permeable tube, wherein the outer diameter of the flange can abut an inner surface of the outer shell, and the flange can be operable to restrain the resilient insert within the length of the outer shell.

In some examples, the restraining insert of the fluid noise suppressor can further include a restraining portion integral to the outer shell operable to restrain the resilient insert within the outer shell.

In some examples, the resilient insert can include a first discrete resilient insert portion and a second discrete resilient insert portion that can be operable to physically abut one another, preventing radial compression of the resilient insert that would lead to ineffective fluid noise reduction.

In some examples, the resilient insert can include an annular cross-section; and wherein each of the discrete resilient insert portion can include a partially annular cross-section.

In some examples, the resilient insert can be segmented axially to form the first discrete resilient insert portion and the second discrete resilient insert portion.

Other implementations, features, and aspects of the disclosed technology are described in detail herein and are considered a part of the claimed disclosed technology and can be understood with reference to the following detailed description, accompanying drawings, and claims.

BRIEF DESCRIPTION OF THE FIGURES

Reference will now be made to the accompanying figures and flow diagrams, which are not necessarily drawn to scale.

DETAILED DESCRIPTION

Examples presented herein generally include fluid system can include a fluid noise suppressor having a resilient insert having an outer surface; wherein the resilient insert can be operable to dampen a fluctuation of a total pressure about the mean static pressure, providing effective noise reduction that without the resilient insert, would have occurred in the flowing fluid with the fluctuation; and wherein the mean static pressure can be between about 100 psig to about 10,000 psig.

Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. But it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Figure 1A:
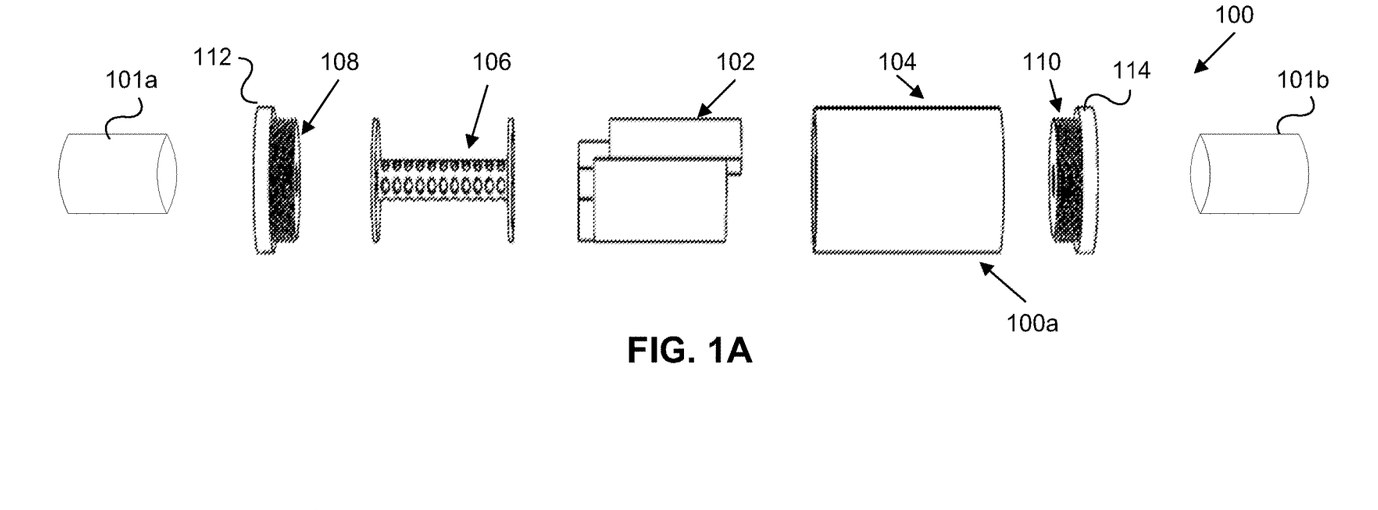
FIGS. 1A-D illustrate an exploded view of an example fluid system, as disclosed herein.

FIG. 1A illustrates a fluid system 100. The fluid system 100 can include a fluid noise suppressor 100a, an upstream fluidic conduit 101a (i.e. an upstream portion of a fluidic conduit), and a downstream fluidic conduit 101b (i.e. a downstream portion of a fluidic conduit). The upstream and downstream fluidic conduits 101a, 101b can be plumbing fittings, fixtures, connectors, regulators, valves, and/or piping as known to one of in the art. In example, the fluidic conduits 101a, 101b can be configured to transport fluid at a mean static pressure between about 100 psig and 10,000 psig. In some examples, the mean static pressure can be a single value, such as, 500 psig. In another example, the mean static pressure can be an interval, such as 490 psig to 510 psig. In another example, the mean static pressure can be a value within a threshold value, such as, 500 psig±10%, or 500 psig±50 psig. The fluidic conduits 101a, 101b can be dimensioned, configured, and/or operable to comply with applicable regulatory codes such as codes published by the National Fluid Power Association (NFPA), American National Standards Institute (ANSI), Society of Automotive Engineers (SAE), or similar regulatory entities. The fluid noise suppressor 100a can include a resilient insert 102, an outer shell 104, a restraining insert 106, a fluid inlet connector 108, a fluid outlet connector 110, an upstream end 112, and a downstream end 114. The fluid noise suppressor 100a can be dimensioned, configured, and/or operable to comply with applicable regulatory codes such as codes published by the National Fluid Power Association (NFPA), American National Standards Institute (ANSI), Society of Automotive Engineers (SAE), or similar the regulatory entities. Each of the fluid conduits 101a, 101b can be operable to transport a fluid into and/or out of the fluid noise suppressor 100a.

Figure 1B:
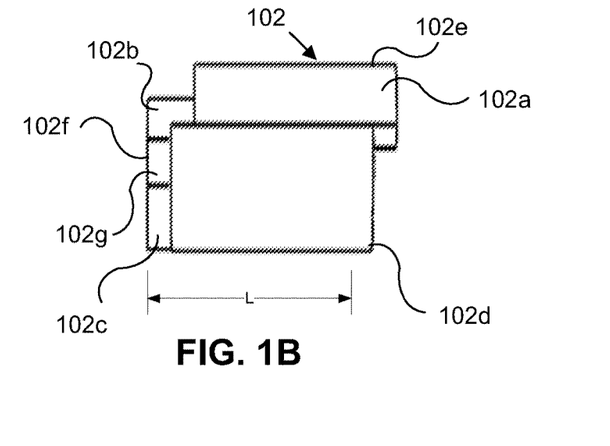

Turning to FIG. 1B, the resilient insert 102 can be operable to dampen a fluctuation of a total pressure about the mean static pressure, providing effective noise reduction that without the resilient insert 102, would have occurred in the flowing fluid with the fluctuation. The mean static pressure is between about 100 psig to about 10,000 psig. The resilient insert 102 can be made of a polymeric matrix having a stiffness. The stiffness of the polymeric matrix can be similar to that of syntactic foam, as would be understood by one of skill in the art. The polymeric matrix can be, for example, a urethane or a silicone rubber. The polymeric matrix can include microspheres dispersed within the polymeric matrix. The microspheres can have an internal pressure of 0.1 MPa or greater. Additionally or alternatively, the microspheres can be homogenously dispersed throughout the polymeric matrix. Additionally or alternatively, the microspheres can be heterogeneously dispersed throughout the polymeric matrix. The resilient insert 102 can have cylindrical, cuboid, spherical, patterned and/or asymmetric shape. The resilient insert 102 can have an annular, a solid, a honeycomb, and/or a cuboid cross-section. Additionally or alternatively, the cross-section of the resilient insert 102 can be asymmetric and/or patterned. Additionally or alternatively, the resilient insert 102 can be segmented into two or more discrete resilient insert portions, for example, a first discrete resilient insert portion 102a and a second discrete resilient insert portion 102b. Additionally, the resilient insert 102 can have a third discrete resilient insert portion 102e. The first discrete resilient insert portion 102a can physically abut the second resilient insert portion 102b. The resilient insert 102 can be segmented in a cross-sectional direction, axial direction, and/or in a diagonal direction. The segments can have curvilinear and/or linear cuts. Additionally or alternatively, the cuts to segment the resilient insert 102 into a first discrete resilient insert portion 102a and the second discrete resilient insert portion 102b can be along the outer surface 102c of the resilient insert 102. It may be advantageous to segment the resilient insert 102 along the outer surface 102c because the lack of direct connectivity between the first discrete resilient insert portion 102a and the second resilient insert portion 102b may reduce compression in the radial direction of each resilient insert portion 102a, 102b. This is desirable because radial compression can lead to reduced performance of the fluid noise suppressor. Additionally, the resilient insert 102 can have a length L.

Additionally or alternatively, each discrete portion can different polymeric matrices, microsphere dispersion, microsphere internal pressures, and/or stiffnesses. It may be advantageous to have a polymeric matrix with dispersed pressurized microspheres because the polymeric matrix can absorb a portion of the pressure fluctuation and convert it into a mechanical displacement of the polymeric matrix. Additionally, the pressurized microspheres further absorb a portion of the pressure fluctuation by compressing under a pressure greater than their internal pressure. Further, common polymeric foam materials may not be mechanically robust enough for use in fluid noise suppressor devices. Additionally or alternatively, the resilient insert 102 can include an inner surface 102d, the inner surface 102d can define therethrough a channel 102g for a fluid flowing along a length of the resilient insert 102. The resilient insert 102 can include at least one opening 102f that connects the outer surface 102c to the inner surface 102d. Additionally or alternatively, the channel 102g can have a first opening 102f connecting to the inner surface 102d, which can define a cavity. Additionally or alternatively, the channel 102g can have a second opening operable to connect the outer surface 102c to the inner surface 102d. Additionally or alternatively, the outer surface 102c of the resilient insert 102 can define a channel between the outer surface 102c and the outer shell 104 for a fluid flowing along a length of the resilient insert 102, as will be discussed in detail in FIG. 2B. Additionally or alternatively, the resilient insert 102 can be concentrically aligned within the outer shell 104. Additionally, the resilient insert 102 can have a length L.

Figure 1C:
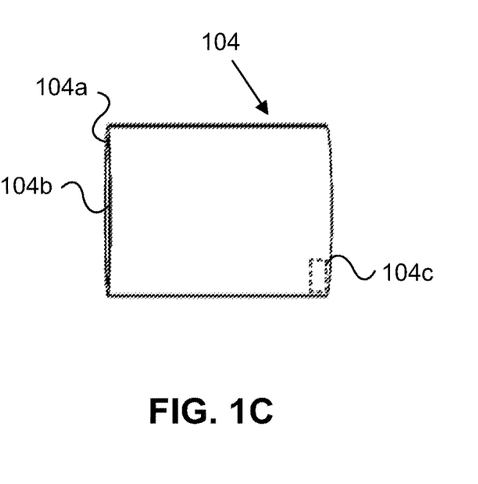

Turning to FIG. 1C, the outer shell 104 can have an inner surface 104a and an opening 104b. Additionally or alternatively, the outer shell 104 can have a restraining portion 104c integral to the outer shell 104 and operable to restrain the resilient insert 102 within the outer shell 104 to prevent clogging of the fluid outlet connector 110. The restraining portion 104c can be one or more of: nubs, claws, protrusions, patterns, and/or diameter reducing mechanisms. The outer shell 104 can be manufactured from plastics such as PVC, and/or metals such as copper, and can be operable to withstand pressures exceeding 100 psig.

Figure 1D:
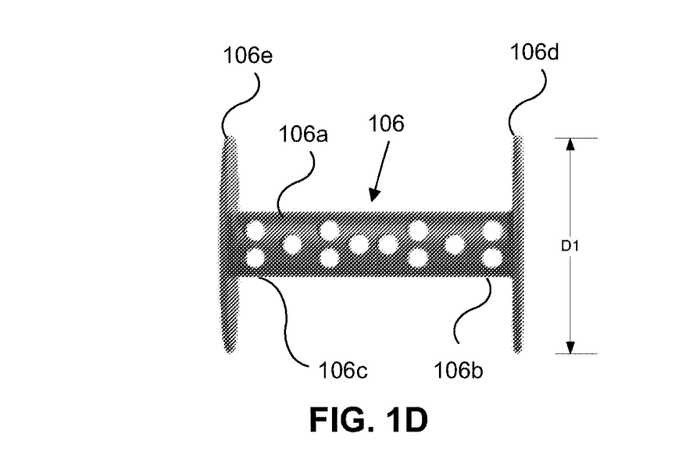

Turning to FIG. 1D, the restraining insert 106 can include a permeable tube 106a having a first end 106b and a second end 106c. The permeable tube 106a (i.e. a permeable cage) can include holes, slots, and/or other perforation operable to allow fluid transfer to and from the resilient insert. Additionally or alternatively, the permeable tube 106a can be a permeable membrane operable to allow fluids to diffuse into and out of the resilient insert 102. For example, the permeable tube 106a can be at least partially surrounded by the resilient insert 102. In another example, the permeable tube 106a can at least partially surround the resilient insert 102. Additionally or alternatively, the permeable tube 106a can include a first flange 106d on at least one of the first or second end 106b, 106c. The first flange 106d can be operable to restrain the resilient insert 102 within the outer shell 104 keeping the resilient insert 102 from clogging the fluid outlet connector 110. Additionally or alternatively, the permeable tube 106a can include a second flange 106e on at least one of the first or second end 106b, 106c. The second flange 106e can be operable to restrain the resilient insert 102 within the outer shell 104 keeping the resilient insert 102 from clogging the fluid inlet connector 108. At least one of the first of second flanges 106d, 106e can have an outer diameter D1 configured to reside within in the outer shell 104. The resilient insert 106 can be manufactured from plastics such as PVC, and/or metals such as copper.

Turning back to FIG. 1A, the fluid inlet connector 108 can be disposed on an upstream end 112 of the fluid noise suppressor 100a providing both connectivity of the upstream end 112 of the fluid noise suppressor 100a to the upstream fluidic conduit 101a and to inhibit travel of the resilient insert 102 into the upstream fluidic conduit 101a. The fluid inlet connector 108 can include a threaded portion configured to receive the upstream fluidic conduit 101a. One of skill in the art would appreciate that the threads can comply with existing standards for pipe threads, for example, American National Standard Pipe thread (NPT) standards. Additionally or alternatively, the fluid inlet connector 108 can have a custom thread and/or fitting depending on the application. The fluid inlet connector 108 can be manufactured from metals and/or plastics. Additionally or alternatively, the fluid inlet connector 108 can be integral to the outer shell 104. Additionally or alternatively, the fluid inlet connector 108 can be discrete to the outer shell 104.

The fluid outlet connector 110 (i.e. fluid connector) can be disposed on a downstream end 114 of the fluid noise suppressor 100a providing both connectivity of the downstream end 114 of the fluid noise suppressor 100a to the downstream fluidic conduit 101b and to inhibit travel of the resilient insert 102 into the downstream fluidic conduit 101b. The fluid outlet connector 110 can include a threaded portion configured to receive the downstream fluidic conduit 101b. One of skill in the art would appreciate that the threads can comply with existing standards for pipe threads, for example, American National Standard Pipe thread (NPT) standards. Additionally or alternatively, the fluid outlet connector 110 can have a custom thread and/or fitting depending on the application. The fluid outlet connector 110 can be manufactured from metals and/or plastics. Additionally or alternatively, the fluid outlet connector 110 can be integral to the outer shell 104. Additionally or alternatively, the fluid outlet connector 110 can be discrete to the outer shell 104.

Figure 2A:
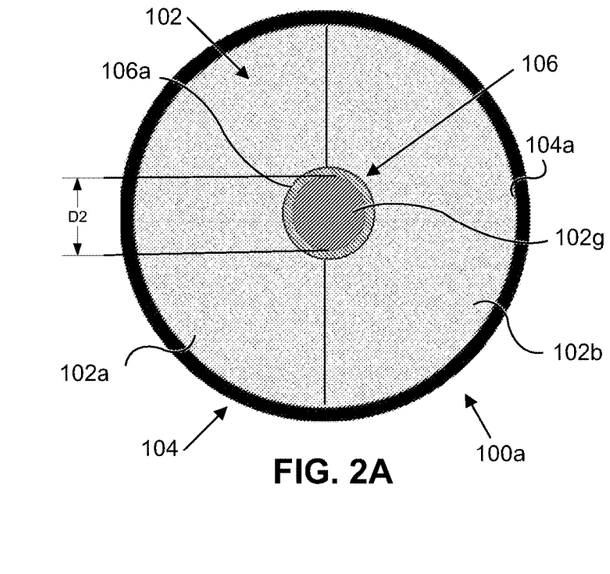
FIGS. 2A-B illustrates a cross-section view of an example fluid noise suppressor, as disclosed herein.

FIG. 2A illustrates a cross-sectional view of an example fluid noise suppressor 100a. Fluid noise suppressor 100a can include the resilient insert 102, for example, including the first discrete resilient insert portion 102a, and the second resilient insert portion 102b configured such that each portion 102a, 102b can have a partially annular cross-section, which when configured to physically abut one another, form an annular cross-section. The channel 102g can have an inner diameter D2. The inner diameter D2 can be similar in dimension to an inner diameter of the upstream and/or downstream fluidic conduit 101a, 101b. The permeable tube 106a can be surrounded by the inner surface 102c resilient insert 102.

Figure 2B:
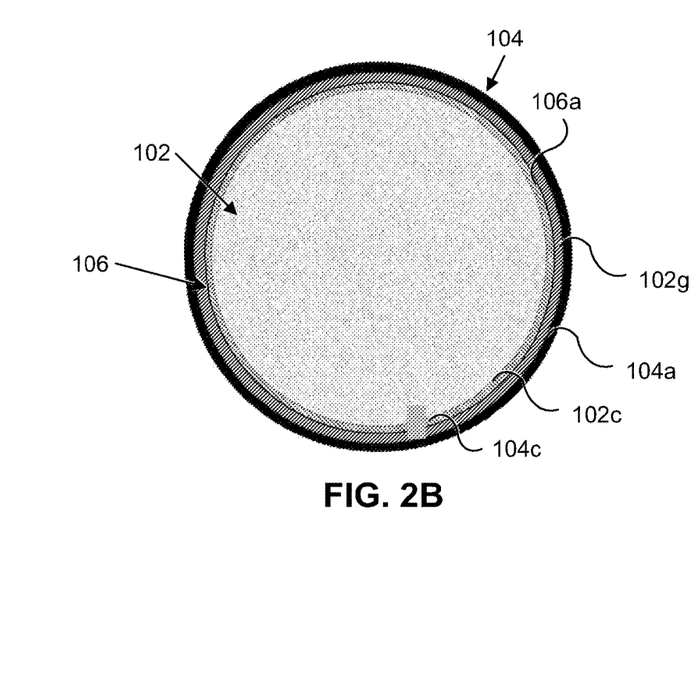

FIG. 2B illustrates a cross-sectional view of an example fluid noise suppressor. The permeable tube 106a (i.e. permeable cage) can surround the outer surface 102c of the resilient insert 102. The channel 102g can be defined between the inner surface 104a of the outer shell 104, and the outer surface 102c of the resilient insert 102. The resilient insert 102 can be centered within the outer shell 104 by utilizing the first and/or second flange 106d, 106e, of the restraining insert 106 and/or an integral restraining portion 104c.

Figure 3:
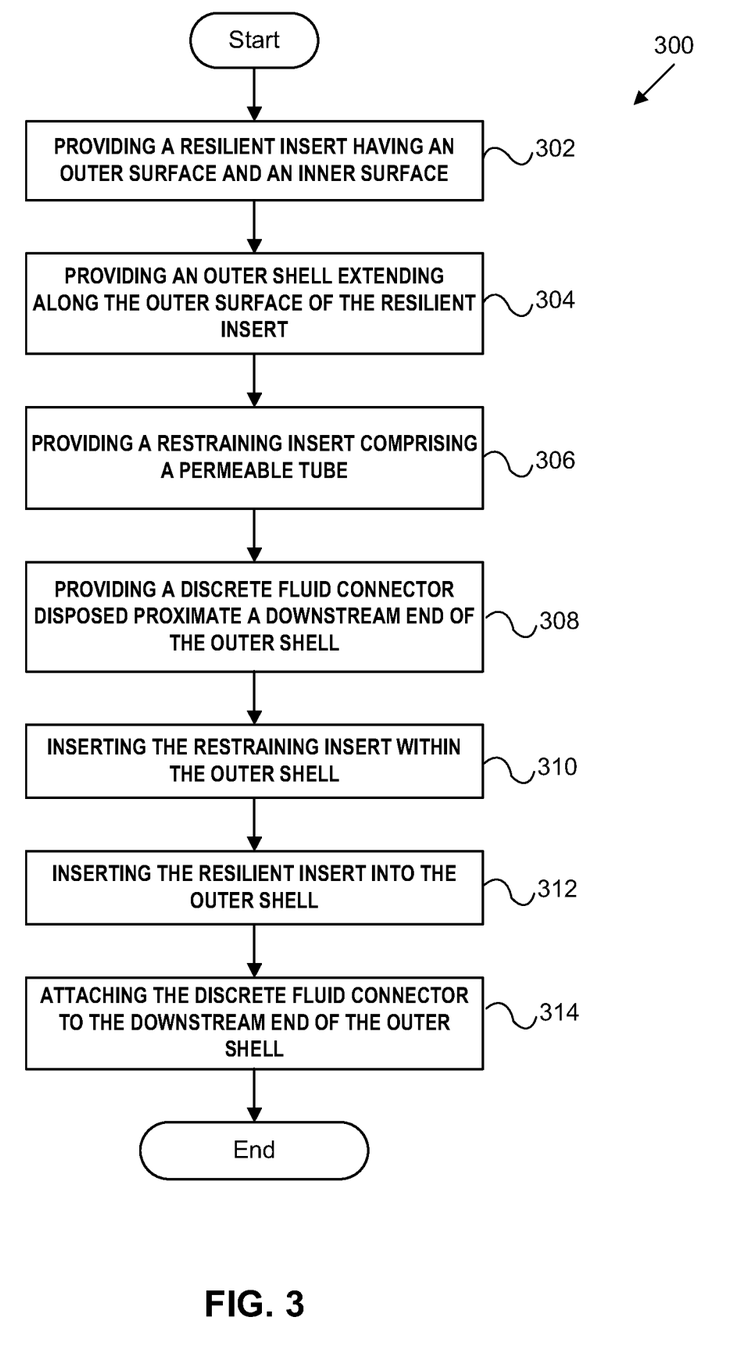
FIG. 3 illustrates a method for manufacturing an example in-line fluid noise suppressor, as disclosed herein.

FIG. 3 illustrates an example method 300 for manufacturing an example in-line fluid noise suppressor. At block 302, the method can include providing a resilient insert having an outer surface and an inner surface, the inner surface defining therethrough a channel for a fluid to flow along a length of the resilient insert, the resilient insert can be operable to dampen a fluctuation of a total pressure in the fluid that exceeds a mean static pressure, providing effective fluid-borne noise suppression that without the resilient insert, would have occurred in the flowing fluid with the fluctuation. Additionally or alternatively, the resilient insert can include a first discrete resilient insert portion and a second discrete resilient insert portion that can be operable to physically abut one another, preventing radial compression of the resilient insert that may lead to ineffective fluid-borne noise reduction. Additionally or alternatively, the resilient insert can have a substantially annular cross-section. Additionally or alternatively, the several discrete resilient insert portion can have a partially annular cross-section. Additionally or alternatively, first discrete resilient insert portion and second discrete resilient insert portion can be segmented axially.

At block 304, the method can include providing an outer shell extending along the outer surface of the resilient insert, the outer shell having an integral fluid connector, and an inner wall, the integral fluid connector disposed proximate an upstream end of the outer shell. Additionally or alternatively, the integral fluid connector disposed on an upstream end of the outer shell can be configured to provide fluid connectivity between an upstream portion of the channel and an upstream end of a fluidic conduit. Additionally or alternatively, the outer shell can include a restraining portion integral to the outer shell operable to restrain the resilient insert within the outer shell. At block 306, the method can include providing a restraining insert comprising a permeable tube operable to enable fluid communication between the outer surface of the resilient insert and the channel. At block 308, the method can include providing a discrete fluid connector disposed on a downstream end of the outer shell. Additionally or alternatively, the discrete fluid connector disposed on a downstream end of the outer shell can be configured to provide fluid connectivity between a downstream portion of the channel and a downstream end of a fluidic conduit.

At block 310, the method can include inserting the restraining insert within the outer shell. Additionally or alternatively, the restraining insert can include at least one flange with an outer diameter and disposed on at least one end of the permeable tube, wherein the outer diameter of the flange can abut an inner surface of the outer shell, and the flange can be operable to restrain the resilient insert within the outer shell. At block 312, the method can include inserting the resilient insert into the outer shell. At block 314, the method can include attaching the discrete fluid connector to the downstream end of the outer shell.

In an example, a fluid noise suppressor can include a foam material configured as a lining within a cylindrical pressure-containing shell, and with a central tube. However, under pressure, the cylinder of foam compresses radially, causing loading on the support tube, reduction of performance, and the potential to trap pressure. The foam material can be segmented into one or more axial segments, such that there need not be continuity of material in the circumferential direction prevents the radial compression of the foam, eliminating the behavior that impairs the performance.

In an example, a fluid noise suppressor uses an axially segmented syntactic foam. The syntactic foam can be comprised of a host matrix (such as a urethane) with embedded microspheres. The microspheres can be charged with gas, at a pressure which may be above atmospheric pressure. Under pressure, the microspheres buckle, reducing the stiffness of the material, while retaining the gas itself. In addition, the high volume fraction of microspheres (typically 50%) yields a material with a fine-grained micro-structure, such that the host material also contributes compliance. In concert, the macroscopically segmented syntactic foam liner retains compliance to higher static pressure as compared to classical foams. The segmentation prevents pressure trapping and radial collapse of the liner, such that the fluid noise suppressor performs its intended function across varying system pressure.

While certain techniques and methods of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid system comprising:
   a fluid noise suppressor comprising:
     a resilient insert having an outer surface;
     an outer shell extending for a length of the outer surface of the resilient insert; and
     a permeable cage extending along the outer surface of the resilient insert and positioned between the outer shell and the resilient insert;
     wherein the resilient insert is operable to dampen a fluctuation of a total pressure about a mean static pressure, providing effective noise reduction that without the resilient insert, would have occurred in a flowing fluid with the fluctuation; and
     wherein the mean static pressure is between about 100 psig to about 10,000 psig.

2. The fluid system of claim 1, wherein the outer shell defines a fluid channel between the outer surface of the resilient insert and an inner surface of the outer shell.

3. The fluid system of claim 1, wherein the fluid noise suppressor further comprises a restraining portion integral to the outer shell and operable to restrain the resilient insert within the outer shell.

4. The fluid system of claim 1, wherein the resilient insert and the outer shell are concentrically aligned.

5. The fluid system of claim 1, wherein the resilient insert further comprises an inner surface defining therethrough a channel for a fluid flowing along a length of the resilient insert having a mean static pressure.

6. The fluid system of claim 1 further comprising an existing length of a fluidic conduit;
   wherein the fluid noise suppressor is located between an upstream portion and downstream portion of the existing length of the fluidic conduit; and
   wherein the upstream portion of the existing length of the fluidic conduit, the fluid noise suppressor, and the downstream portion of the existing length of the fluidic conduit, are in fluidic communication along the existing length of the portions and fluid noise suppressor.

7. The fluid noise suppressor system of claim 6 further comprising:
   a fluid inlet connector disposed on an upstream end of the fluid noise suppressor providing both connectivity of the upstream end of the fluid noise suppressor to the upstream portion of the fluidic conduit and to inhibit travel of the resilient insert into the upstream portion of the fluidic conduit; and
   a fluid outlet connector disposed on a downstream end of the fluid noise suppressor providing both connectivity of the downstream end of the fluid noise suppressor to the downstream portion of the fluidic conduit and to inhibit travel of the resilient insert into the downstream portion of the fluidic conduit.

8. The fluid system of claim 1, wherein the resilient insert comprises a first discrete resilient insert portion and a second discrete resilient insert portion that are operable to physically abut one another, preventing radial compression of the resilient insert that would lead to ineffective noise reduction.

9. The fluid system of claim 1, wherein the resilient insert has an annular cross-section.

10. The fluid system of claim 8, wherein the resilient insert is segmented axially to form the first discrete resilient insert portion and the second discrete resilient insert portion.

11. The fluid system of claim 8, wherein each discrete resilient insert portion comprises:
- a polymeric matrix having a stiffness; and
- microspheres dispersed within the polymeric matrix;
- wherein the microspheres are pressurized to a pressure of 0.1 MPa or greater; and
- wherein the stiffness of the polymeric matrix of at least one of the discrete resilient insert portions is different from another of the discrete resilient insert portions.

12. The fluid system of claim 1, wherein resilient insert comprises:
- a polymeric matrix having a stiffness; and
- microspheres dispersed within the polymeric matrix.

13. The fluid system of claim 12, wherein the microspheres are pressurized to an internal pressure of 0.1 MPa or greater; and
- wherein the microspheres are homogeneously dispersed within the polymeric matrix.

14. The fluid system of claim 12, wherein the microspheres are pressurized to an internal pressure of 0.1 MPa or greater; and
- wherein the microspheres are heterogeneously dispersed within the polymeric matrix.

15. A fluid noise suppressor system comprising:
- an upstream portion of a fluidic conduit;
- a fluid noise suppressor located downstream of the upstream portion of the fluidic conduit; and
- a downstream portion of the fluidic conduit being located downstream of the fluid noise suppressor;
- wherein the fluid noise suppressor comprises:
  - a resilient insert having an outer surface, an annular cross-section and comprising at least two discrete resilient insert portions;
  - wherein the fluid noise suppressor and the portions of the fluidic conduit are configured for a flowing fluid within each having a mean static pressure;
  - wherein the at least two discrete resilient insert portions are operable to physically abut one another, preventing radial compression of the resilient insert that would lead to ineffective fluid noise reduction;
  - wherein the resilient insert is operable to dampen a fluctuation of a total pressure about a mean static pressure, providing effective noise reduction that without the resilient insert, would have occurred in the flowing fluid with the fluctuation;
  - wherein the mean static pressure is between about 100 psig to about 10,000 psig; and
  - wherein each discrete resilient insert portion comprises a partially annular cross-section.

16. The fluid noise suppressor system of claim 15, wherein the fluid noise suppressor further comprises an outer shell extending for a length of the outer surface of the resilient insert; and
- wherein the resilient insert further has an inner surface defining therethrough a channel having an inner diameter substantially similar to an inner diameter of the upstream and downstream portions of the fluidic conduit.

17. The fluid system of claim 15, wherein the resilient insert is segmented axially to form the discrete resilient insert portions.

18. The fluid noise suppressor system of claim 15 further comprising:
- a fluid inlet connector disposed on an upstream end of the fluid noise suppressor providing both connectivity of the upstream end of the fluid noise suppressor to the upstream portion of the fluidic conduit and to inhibit travel of the resilient insert into the upstream portion of the fluidic conduit; and
- a fluid outlet connector disposed on a downstream end of the fluid noise suppressor providing both connectivity of the downstream end of the fluid noise suppressor to the downstream portion of the fluidic conduit and to inhibit travel of the resilient insert into the downstream portion of the fluidic conduit.

19. The fluid noise suppressor system of claim 18 further comprising a permeable tube extending for a length of an inner surface of the resilient insert and operable to enable fluidic communication from the fluid inlet connector through the fluid outlet connector;
- wherein the inner surface of the resilient insert defines therethrough a channel having an inner diameter substantially similar to an inner diameter of the upstream and downstream portions of the fluidic conduit.

20. The fluid noise suppressor system of claim 19, wherein the fluid noise suppressor further comprises an outer shell extending for a length of the outer surface of the resilient insert; and
- wherein the permeable tube further comprises a flange located on least at one end of the permeable tube and operable to restrain the resilient insert within the outer shell.

21. The fluid noise suppressor of claim 16 further comprising a restraining portion integral to the outer shell and operable to restrain the resilient insert within the outer shell.

22. The fluid noise suppressor system of claim 15 further comprising:
- a fluid inlet connector disposed on an upstream end of the fluid noise suppressor;
- a fluid outlet connector disposed on a downstream end of the fluid noise suppressor; and
- a restraining insert;
- wherein the restraining insert comprises:
  - a permeable tube; and
  - wherein the permeable tube is operable to enable fluidic communication from the fluid inlet connector through the fluid outlet connector.

23. The fluid noise suppressor system of claim 22 further comprising a flange with an outer diameter disposed on an end of the permeable tube;
- wherein the fluid noise suppressor further comprises an outer shell extending for a length of the outer surface of the resilient insert;
- wherein the outer diameter of the flange abuts an inner surface of the outer shell; and
- wherein the flange is operable to restrain the resilient insert within the length of the outer shell.

24. The fluid noise suppressor of claim 22 further comprising a restraining portion;
- wherein the fluid noise suppressor further comprises an outer shell extending for a length of the outer surface of the resilient insert; and
- wherein the restraining portion is integral to the outer shell and operable to restrain the resilient insert within the outer shell.

25. A method for manufacturing a fluid noise suppressor comprising:
- providing a resilient insert having an outer surface and an inner surface, the inner surface defining therethrough a fluid channel for a fluid flowing along a length of the resilient insert, the resilient insert comprising at least two discrete resilient insert portions, each resilient insert portion comprising a partially annular cross-section, the discrete resilient insert portions operable to physically abut one another, preventing radial compression of the resilient insert that would lead to ineffective fluid noise reduction;

providing an outer shell extending along the outer surface of the resilient insert, the outer shell having a fluid inlet connector integral therewith, and an inner surface, the integral fluid inlet connector disposed on an upstream end of the outer shell is configured to provide fluid connectivity between an upstream portion of the fluid channel and an upstream portion of a fluidic conduit;

providing a restraining insert comprising a permeable tube operable to enable fluidic communication through the fluid channel;

providing a discrete fluid outlet connector disposed on a downstream end of the outer shell is configured to provide fluid connectivity between a downstream portion of the fluid channel and a downstream portion of the fluidic conduit;

inserting the restraining insert radially within the resilient insert;

inserting the resilient insert radially into the outer shell; and attaching the discrete fluid outlet connector to the downstream end of the outer shell.

26. A method of noise reduction in a fluid system comprising:

flowing a fluid through a fluidic conduit having an upstream portion and a downstream portion, the fluid having fluid noise above a threshold level;

flowing the fluid through a fluid noise suppressor positioned in the fluidic conduit:
  downstream of the upstream portion of the fluidic conduit; and
  upstream of the downstream portion of the fluidic conduit;

wherein the fluid noise of the fluid flowing through the fluid noise suppressor is reduced below the threshold level;

wherein the fluid noise suppressor comprises:
  a resilient insert having an outer surface; and
  an outer shell extending for a length of the outer surface of the resilient insert; and wherein at least one of:
  the fluid noise suppressor further comprises a permeable cage extending along the outer surface of the resilient insert and positioned between the outer shell and the resilient insert; or
  the resilient insert comprises at least two discrete resilient insert portions, each resilient insert portion comprising a partially annular cross-section, the discrete resilient insert portions operable to physically abut one another, preventing radial compression of the resilient insert that would lead to ineffective fluid noise reduction.

* * * * *